(12) United States Patent
Xu et al.

(10) Patent No.: US 8,711,400 B2
(45) Date of Patent: Apr. 29, 2014

(54) PROFILE AND TEMPLATE BASED DYNAMIC PORTABLE USER WORKFLOW

(75) Inventors: Steven Xu, Stevenage (GB); Naveed Anis Khawaja, Garden City (GB)

(73) Assignee: Xerox Corporation, Norwalk, CT (US)

( * ) Notice: Subject to any disclaimer, the term of this patent is extended or adjusted under 35 U.S.C. 154(b) by 729 days.

(21) Appl. No.: 12/732,495

(22) Filed: Mar. 26, 2010

(65) Prior Publication Data
US 2011/0235089 A1    Sep. 29, 2011

(51) Int. Cl.
*G06K 15/00* (2006.01)
(52) U.S. Cl.
USPC .......................... 358/1.15; 358/1.18; 358/1.13
(58) Field of Classification Search
USPC ............. 358/1.15; 399/81; 715/700, 748, 741
See application file for complete search history.

(56) References Cited

U.S. PATENT DOCUMENTS

| | | | |
|---|---|---|---|
| 6,032,004 A | 2/2000 | Mirabella, Jr. et al. | |
| 2005/0128501 A1 | 6/2005 | Choi et al. | |
| 2005/0254079 A1 | 11/2005 | Han | |
| 2005/0270555 A1 | 12/2005 | Lee | |
| 2005/0286950 A1 | 12/2005 | Kim | |
| 2009/0024531 A1* | 1/2009 | Yamahata et al. | 705/55 |
| 2009/0027700 A1* | 1/2009 | Kim et al. | 358/1.6 |
| 2009/0122358 A1* | 5/2009 | Moore et al. | 358/473 |
| 2009/0262385 A1* | 10/2009 | Dantwala | 358/1.15 |
| 2011/0212586 A1* | 9/2011 | Grebs et al. | 438/270 |

* cited by examiner

*Primary Examiner* — Mark Zimmerman
*Assistant Examiner* — Lawrence Wills
(74) *Attorney, Agent, or Firm* — Gibb & Riley, LLC

(57) ABSTRACT

A printing device receives a user profile from a computerized device. The user profile comprises at least one template and the template comprises selections of menu options offered by the printing device. The method stores the user profile within a computer readable storage medium of the printing device. The user will operate the printing device using the profile and the template more than one time. Therefore, the method presents the user with an option to access the user profile and the template maintained within the computer readable storage medium of the printing device, through a graphic user interface of the printing device, each time the user operates the printing device. Further, the method automatically selects the menu options offered by the printing device according to selected menu options identified by the template, each time the user accesses the user profile and the template. The method performs various operations according to the selected menu options identified by the template using the printing device after automatically selecting the menu options.

16 Claims, 6 Drawing Sheets

PROFILE AND TEMPLATE BASED DYNAMIC PORTABLE USER WORKFLOW

BACKGROUND AND SUMMARY

Embodiments herein generally relate to the utilization of printing devices that have multiple menu options and more particularly to methods and devices that utilize a profile that includes templates that are reused by such printing devices, which avoids requiring the user to reselect the same menu options each time they desire to perform a specific activity with the printing device.

The embodiments herein provide a quick way for a user to perform daily tasks routinely with ease. The idea is to let any user with access to a local printing device to set up an unique profile on the machine via, for example, a network based user interface (e.g., a WebUI) which includes user preferences of features frequently used, settings for e-mail, fax etc. These settings can be saved as a series of templates. Once the profile is setup, it can be sent to the machine as a print ready file. The user can go to the printing device's local user interface and login to release the secure settings job. The user is then presented with their profile and template settings, and the user can choose any template settings and start to use the features straight away. The embodiments herein thereby provide a significant time-saver if the user has to regularly send the same e-mails, and the same faxes to a preset list of people routinely, while simultaneously printing and/or making copies.

One method embodiment herein (presented from the viewpoint of a computerized device) creates a user profile for printing device operations using a first computerized device, and creates at least one template within the user profile using the first computerized device. The method sends the user profile from the first computerized device to a printing device. The printing device stores the user profile within a computer readable storage medium of the printing device. The template comprises selections of menu options offered by the printing device. A user will operate the printing device using the profile and the template more than one time, and each time the user operates the printing device, the user is presented with an option to access the user profile to cause the template to automatically select the menu options offered by the printing device. Each time the user operates the printing device after accessing the user profile from the computer readable storage medium of the printing device, the printing device performs operations according to selected menu options identified by the template.

The method also saves the user profile within a computer readable storage medium of the first computerized device. The method can contact a second computerized device through a network to access a utility that creates the user profile and the template. In addition, the user profile can have an expiration date/time, and the printing device deletes the user profile from the computer readable storage medium of the printing device after the expiration time has expired. The user profile can be sent to the printing device as a print ready file.

Another method (presented from the viewpoint of the printing device) comprises receiving, by the printing device, a user profile from the first computerized device. Again, the user profile comprises at least one template and the template comprises selections of menu options offered by the printing device. The method stores the user profile within a computer readable storage medium of the printing device. Again, the user will operate the printing device using the profile and the template more than one time. Therefore, the method presents the user with an option to access the user profile and the template maintained within the computer readable storage medium of the printing device, through a graphic user interface of the printing device, each time the user operates the printing device. Further, the method automatically selects the menu options offered by the printing device according to selected menu options identified by the template, each time the user accesses the user profile and the template. The method performs various operations according to the selected menu options identified by the template using the printing device after automatically selecting the menu options.

Again, the user profile can have an expiration, and the method deletes the user profile from the computer readable storage medium of the printing device after the expiration has expired.

Various device embodiments are also presented below. A printing device embodiment herein comprises a processor and an input/output device operatively connected to the processor. The input/output device receives the user profile from the first computerized device. The printing device also includes a computer-readable storage medium operatively connected to the processor. The computer readable storage medium maintains the user profile.

As above, the user will operate the printing device using the profile and the template more than one time. A graphic user interface is operatively connected to the processor, and the graphic user interface presents the user with an option to access the user profile and the template maintained within the computer readable storage medium of the printing device each time the user operates the printing device. The processor automatically selects the menu options offered by the printing device according to selected menu options identified by the template each time the user accesses the user profile and the template. A printing engine is operatively connected to the processor, and the printing engine performs a printing operation according to the selected menu options identified by the template after the processor automatically selects the menu options.

Again, the user profile can have an expiration date/time, and the processor deletes the user profile from the computer readable storage medium of the printing device after the expiration has expired. Further, the user profile can be received by the input/output device as a print ready file.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, the embodiments herein provide a significant time-saver for users that regularly send the same e-mails, and the same faxes to a preset list of people routinely, while simultaneously printing and/or making copies.

Often users of multi-function printing devices have to carry out routine tasks frequently. This includes copying, scanning, archiving and faxing etc., using the multi-function printing device. In such an environment, there are specific workflows/scenarios/processes defined to carry out the activity and achieve the results.

In one example, it may be necessary (for a certain group of documents) to copy the signed originals with specific quality settings, e-mail scanned copies in multi-page TIFF files to specific recipients, and fax other recipients every Tuesday. To perform such a workflow, in step 1, every Tuesday, the user selects letter size paper, 2 sided with 2 staples on the copy screen. In step 2, in addition to step 1, the user selects specific image options. In step 3, after step 2 for copy, and the user selects multi-page TIFF file format, within the scan to e-mail feature. In step 4, in addition to step 3, the user selects specific recipients every week within the scan to e-mail feature. In step 5, after step 4 for scan to e-mail, the user selects specific fax recipients every week within the fax feature.

This elaborate process is error prone (e.g., some options may not be selected). In addition to the possibility of errors, it is a very time consuming workflow as it includes setting up numerous options on various features every week, over and over again. The embodiments herein improve the usability and efficiency for carrying out such routine tasks.

Figure 1:
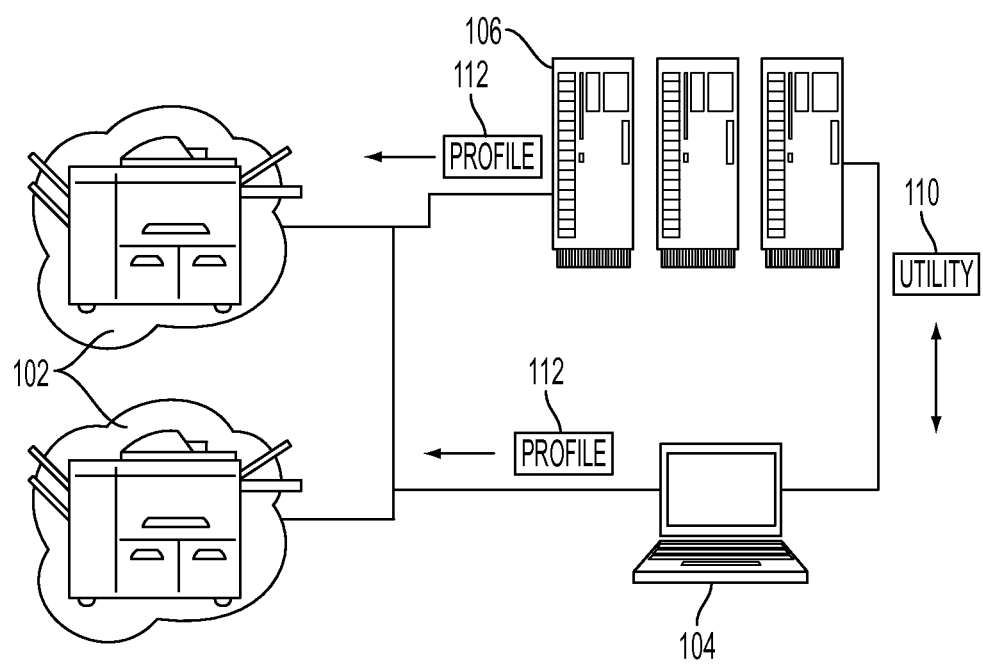
FIG. 1 is a schematic diagram of a system according to embodiments herein.

FIG. 1 illustrates one method embodiment herein in which a computerized device 104 creates a user profile 112 for printing device operations using a first computerized device 104 and creates at least one template within the user profile 112 using the first computerized device 104. The method sends the user profile 112 from the first computerized device 104 to a printing device 102 or directly from other networked devices 106 to the printing device 102.

The printing device 102 stores the user profile 112 within a computer readable storage medium of the printing device 102. The template comprises selections of menu options offered by the printing device 102. A user will operate the printing device 102 using the profile 112 and the template more than one time, and each time the user operates the printing device 102, the user is presented with an option to access the user profile 112 to cause the template to automatically select the menu options offered by the printing device 102. Each time the user operates the printing device 102 after accessing the user profile 112 from the computer readable storage medium of the printing device 102, the printing device 102 performs operations according to selected menu options identified by the template.

The method also saves the user profile 112 within the computer readable storage medium of the first computerized device 104. The method can contact one or more second computerized devices 106 through a network to access a utility 110 that creates the user profile 112 and the template. For example, the utility 110 can comprise a webpage that the user accesses through their computerized device 104. Alternatively, the utility 110 can be downloaded to the computerized device 104 and executed on the computerized device 104. An exemplary screen shot 400 provided by the utility 110 is illustrated below in FIG. 4.

In addition, the user profile 112 can have an expiration date/time and the printing device 102 deletes the user profile 112 from the computer readable storage medium of the printing device 102 after the expiration time has expired. The user profile 112 can be sent to the printing device 102 as a print ready file, which makes the profile very portable.

Figure 2:
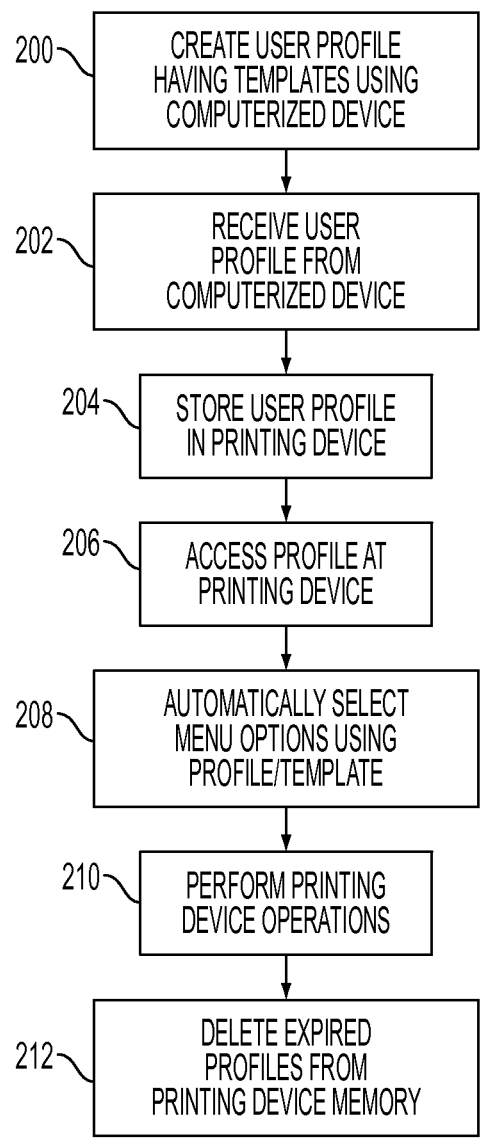
FIG. 2 is a flow diagram illustrating embodiments herein.

Another method, presented in flowchart form in FIG. 2, illustrates the formation of the user profile (using the computer 104 and utility 110). Again, the user profile comprises at least one template and the template comprises selections of menu options offered by the printing device. The printing device receives the user profile from the first computerized device in item 202. The method stores the user profile within a computer readable storage medium of the printing device in item 204.

Again, the user will operate the printing device using the profile and the template more than one time. Therefore, the method presents the user with an option to access the user profile and the template maintained within the computer readable storage medium of the printing device, through a graphic user interface of the printing device, each time the user operates the printing device (item 206). Further, in item 208 the method automatically selects the menu options offered by the printing device according to selected menu options identified by the template, each time the user accesses the user profile and the template. The method performs various operations according to the selected menu options identified by the template using the printing device after automatically selecting the menu options.

Again, the user profile can have an expiration date/time, and the method can delete the user profile from the computer readable storage medium of the printing device after the profile has expired in item 212.

Various device embodiments are also presented below. A printing device embodiment herein comprises a printer body housing 300 having one or more functional components such as printing engines 310, 312, 314 that operate on the external power source 330. Further, the printing device includes at least one accessory functional component (such as a scanner/document handler 304, sheet supply 302, finisher 308, etc.) that operate on the power from the external power source 330. The document handler 304 is also operatively connected to the processor 324. The document handler 304 includes a scanner and belts and other media movement devices that move the sheets by the scanner, allowing images to be captured from the sheets and processed according to the menu selections.

Figure 3:
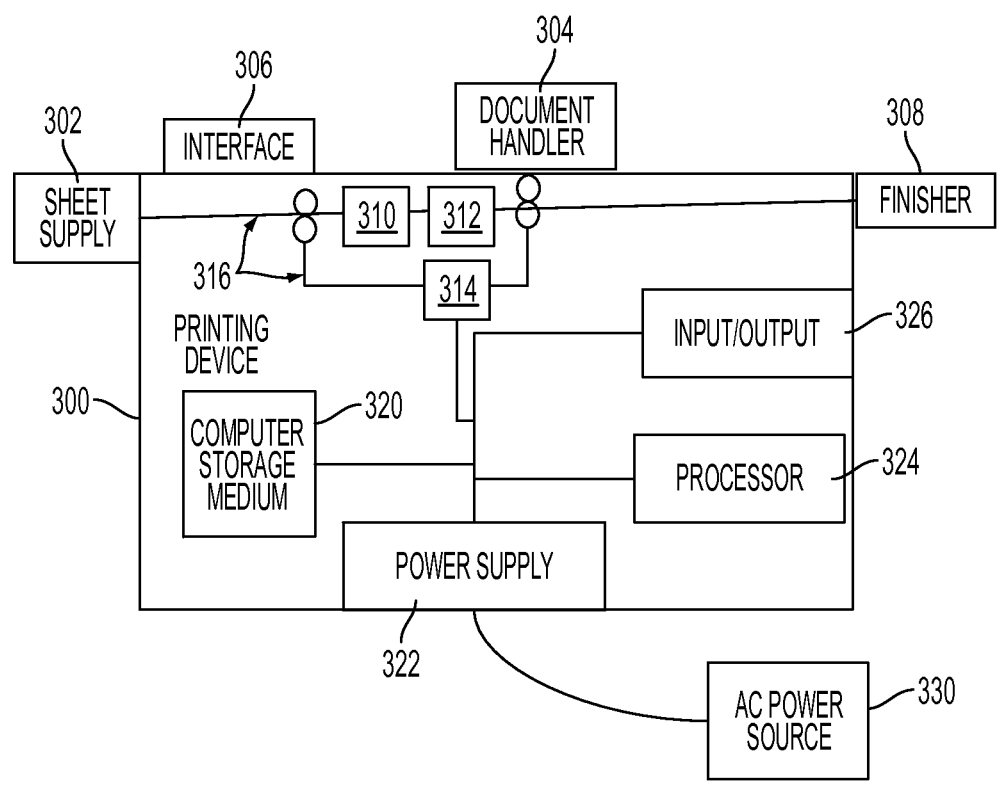
FIG. 3 is a schematic diagram of a multi-function printing device according to embodiments herein.

In the multi-function printing device shown in FIG. 3, sheets of media are supplied from a sheet supply 302 along a paper path 316 to the various printing engines 310, 312, 314. After receiving various markings from the printing engines 310, 312, 314, the sheets of media pass to a finisher 308 which can fold, staple, sort, etc., the various printed sheets. An input/output device 326 is used for communications to and from the multi function printing device 300.

A processor 324 controls the various actions of the printing device. A computer storage medium 320 (which can be optical, magnetic, capacitor based, etc.) is readable by the processor 324 and stores instructions that the processor 324 executes to allow the multi-function printing device to perform its various functions. The power supply 322 connects to an external alternating current power source 330 and converts the external power into the type of power needed by the various devices mentioned above.

The input/output device 326 receives the user profile from the first computerized device. The computer readable storage medium 320 also maintains the user profile. The processor 324 presets various menu options of the multi-function printing device 300 when one of the profiles/templates is selected by a user operating the multi-function printing device 300.

As above, the user will operate the printing device 300 through the graphic user interface 306 using the profile and the template more than one time. The graphic user interface 306 is operatively connected to the processor 324, and the graphic user interface 306 presents the user with an option to access the user profile and the templates maintained within the computer readable storage medium 320 of the printing device 300 each time the user operates the printing device 300.

The processor 324 automatically selects the menu options offered by the printing device 300 according to selected menu options identified by the template each time the user accesses the user profile and the template. The printing engines 310, 312, 314 perform a printing operation according to the selected menu options identified by the template after the processor automatically selects the menu options.

Again, the user profile can have an expiration date/time, and the processor 324 deletes the user profile from the computer readable storage medium 320 of the printing device 300 after the expiration has expired. Further, the user profile can be received by the input/output device 326 as a print ready file.

Figure 4:
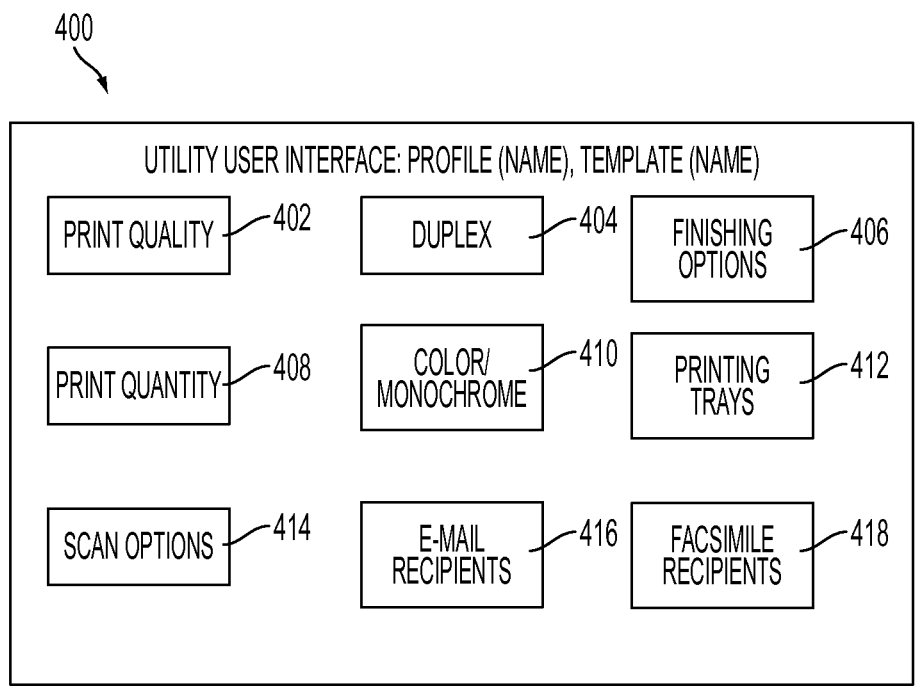
FIG. 4 is a schematic diagram of a screenshot provided by exemplary embodiments herein.

The current embodiments provide the ability to create user profiles where the user can establish personalized menu choices for a given multi-function printing device (or class of multi-function devices) that can be used repeatedly. FIG. 4 illustrates an exemplary registration screen 400 (which can be web-based or local).

The screen shot 400 shown in FIG. 4 would be one of many provided by the utility user interface. For example, using previously presented screens, the user would have chosen a profile name and the template name and various other options, such as expiration date, etc. In the screenshot shown in FIG. 4, for a given profile name and template name, the user is allowed to choose their own preferable settings for each feature, such as copy: set up color options, trays, duplex option, staple option, etc.; e-mail: set up file format, recipients, subject, scanning options, etc.; fax: cover sheet, receiver's fax numbers, scanning options, etc., and save them in a series of templates. Each feature can have multiple template settings for different purposes.

Thus, the screen shot shown in FIG. 4 includes buttons for print quality 402, duplexing 404, finishing options, 406, print quantity 408, color/monochrome printing 410, printing trays, 412, scanning options 414, e-mail recipients 416, and a facsimile recipients 418. Upon selecting each of the buttons, the user is presented an additional screen with further options relating to the menu topic selected. Therefore, for example, if the user selects the print quantity button 408, an additional screen is presented that allows the user to enter the number copies of each document that will be printed. Similarly, if the e-mail recipients button 416 is selected, additional screens are provided to the user to enter various e-mail addresses and e-mailing options. Similar additional screens are provided when each of the other buttons shown in FIG. 4 are selected.

The choices illustrated in FIG. 4 will vary depending upon the multi-function printing device (or class of multi-function printing devices) to which the user has access. Therefore, the user may set up many templates within a given profile, where each different template is specific to a different multi-function printing device. Essentially, the choices illustrated by the utility user interface will be substantially similar to the menu choices provided by the user interface of the multi-function printing device and will change depending upon which multi-function printing device (or class of multi-function printing devices) the user is creating the template for. Thus, in a previous screen to the one shown in FIG. 4, the user has already identified a class (or model) of multi-function printing device, allowing the graphic user interface to provide menu options that are available on the identified multi-function printing device.

Figure 5:
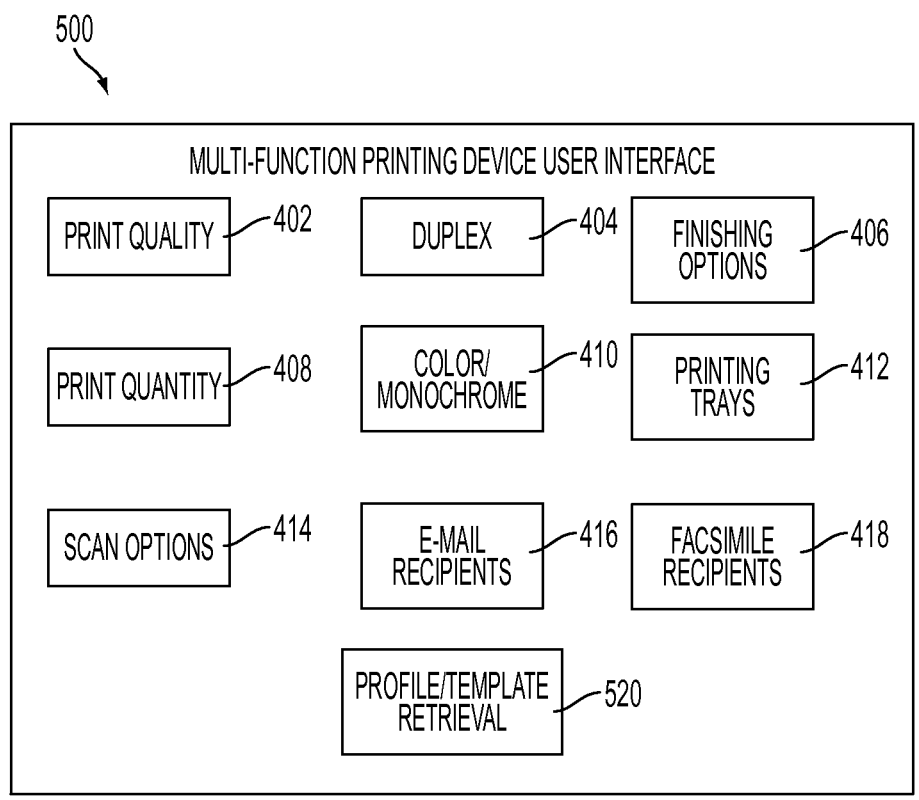
FIG. 5 is a schematic diagram of a screenshot provided by exemplary embodiments herein.

FIG. 5 is a screenshot 500 provided by the user interface of the multi-function printing device corresponding to the screen shot 400 shown in FIG. 4. As explained above, screenshot 500 is substantially similar to screen shot 400 because both relate to the menu choices available on a specific multi-function printing device. However, screenshot 500 also includes a profile/template retrieval button 520. Upon execution of the profile/template retrieval button 520, the user would be presented with an additional screen allowing the user to log in to a certain profile and retrieve a specific template.

Figure 6:
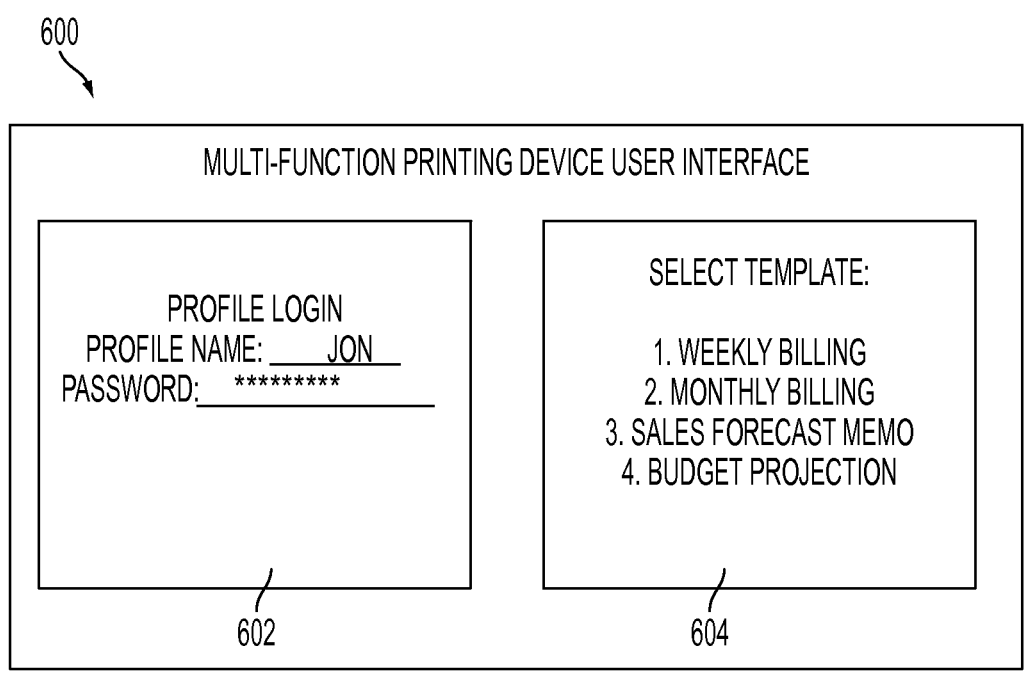
FIG. 6 is a schematic diagram of a screenshot provided by exemplary embodiments herein.

For example, FIG. 6 illustrates an additional screen shot 600 that is displayed by the multi-function printing device's user interface when the user selects the profile/template retrieval button 520. In region 602 of the screenshot 600, their user is provided input areas for the profile name and an optional password. Further, in region 604 of the screenshot 600, the user is presented with various templates choices that can be retrieved from the memory of the multi-function printing device. Upon retrieving the template, the user would not need to select any more options (such as those shown in FIG. 5) as all necessary options would be preset by the selected template, as described above.

The user profile can be saved as a print file, which is downloadable to the multi-function printing devices. In such a situation, the profile is substantially similar to a print file, but contains special identifiers that the multi-function printing device is programmed to recognize as being a profile. This allows the user profile to be handled in a similar manner for delivery to the multi-function printing device as print files would be delivered, and therefore does not present substantial programming burdens on existing architectures.

The user can save the profile on their workstation. If the user wants to register with another multi-function printing device that provides similar menu choices, they can simply submit the saved profile as a print job to additional multi-function printing devices and the new profile will be saved by those additional printing devices. If an additional multi-function printing device has substantially different menu choices, the different profile would be established by the user using the utility discussed above. This process makes it painless to port a user profile to any other multi-function printing devices supporting this feature. Once the user registration process is complete using screens such as that shown in FIG. 4, those customized template settings are ready for use once the user logs into the user interface of the multi-function printing device.

The ability to setup/configure the features from their desks (potentially through a web-based user interface) and saving such in a portable file that can be used in a wide variety of multi-function printing devices is only one application of the present embodiments. The ability to be able to send the profile to the machine as a secure print job is another. Then, the user activates the secure profile when the user is actually standing next to the machine. At that point, all the settings for the printing device are customized according to the preferences defined in the profile. After sending the profile to the multi-function printing device, the user just needs to place the originals on the document handler and use the pre-configured features, completing the operation in a fraction of the original activity time.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
   creating a user profile for printing device operations using a first computerized device;
   creating at least one template within said user profile using said first computerized device; and
   sending said user profile from said first computerized device to a printing device over a network as a print ready file of a print job, said sending delievering said print ready file of said print job in a delievery manner that print files are delivered to said printing device in print jobs over said network,
   said print ready file being distinguished from said print files by identifiers that identify said print ready file as containing said user profile,
   storing said user profile within a computer-readable storage medium positioned within a printer body housing of said printing device,
   said template comprising selections of menu options offered by said printing device,
   wherein a user operates said printing device using said profile and said template more than one time,
   each time said user operates said printing device, said user is presented with an option to access said user profile and to cause said template to automatically select said menu options offered by said printing device, and
   each time said user operates said printing device after accessing said user profile from said computer readable storage medium of said printing device, said printing device performs operations according to selected menu options identified by said template.

2. The method according to claim 1, further comprising saving said user profile within computer-readable storage medium of said first computerized device.

3. The method according to claim 1, further comprising contacting a second computerized device through a network to access a utility that creates said user profile and said template.

4. The method according to claim 1, said user profile having an expiration, said printing device deleting said user profile from said computer readable storage medium of said printing device after said expiration has expired.

5. A method comprising:
   sending, by a printing device, a user profile from a first computerized device over a network as a print ready file of a print job, said sending delivering said print ready file of said print job in a delivery manner that print files are delivered to said printing device in print jobs over said network, said print ready file being distinguished from said print files by identifiers that identify said print ready file as containing said user profile, said user profile comprising at least one template, said template comprising selections of menu options offered by said printing device;
   storing said user profile within a computer-readable storage medium positioned within a printer body housing of said printing device, wherein a user operates said printing device using said profile and said template more than one time;
   presenting said user with an option to access said user profile and said template maintained within said computer-readable storage medium of said printing device, through a graphic user interface of said printing device, each time said user operates said printing device;
   automatically selecting said menu options offered by said printing device according to selected menu options identified by said template, each time said user accesses said user profile and said template; and
   performing various operations according to said selected menu options identified by said template using said printing device after automatically selecting said menu options.

6. The method according to claim 5, said user profile and said template also being maintained within a second computer-readable storage medium of said first computerized device.

7. The method according to claim 5, said first computerized device contacts a second computerized device through a network to access a utility that creates said user profile and said template.

8. The method according to claim 5, said user profile having an expiration, said method further comprising deleting said user profile from said computer-readable storage medium of said printing device after said expiration has expired.

9. A printing device comprising:
   a printer body housing;
   a processor positioned within said printer body housing;
   an input/output device operatively connected to said processor, said input/output device sending a user profile from a first computerized device over a network as a print ready file of a print job, said sending delivering said print ready file of said print job in a delivery manner that print files are delivered to said printing device in print jobs over said network, said print ready file being distinguished from said print files by identifiers that identify said print ready file as containing said user profile, said user profile comprising at least one template, said template comprising selections of menu options offered by said printing device;

a computer-readable storage medium positioned within said printer body housing and being operatively connected to said processor, said computer-readable storage medium maintaining said user profile, wherein a user operates said printing device using said profile and said template more than one time;

a graphic user interface operatively connected to said processor, said graphic user interface presenting said user with an option to access said user profile and said template maintained within said computer-readable storage medium of said printing device each time said user operates said printing device, said processor automatically selecting said menu options offered by said printing device according to selected menu options identified by said template each time said user accesses said user profile and said template; and a printing engine positioned within said printer body housing and operatively connected to said processor, said printing engine performing an operation according to said selected menu options identified by said template after said processor automatically selects said menu options.

10. The printing device according to claim 9, said user profile and said template also being maintained within a second computer-readable storage medium of said first computerized device.

11. The printing device according to claim 9, said first computerized device contacts a second computerized device through a network to access a utility that creates said user profile and said template.

12. The printing device according to claim 9, said user profile having an expiration, said processor deleting said user profile from said computer-readable storage medium of said printing device after said expiration has expired.

13. A non-transitory computer-readable storage medium storing a program of instructions executable by a computerized device, said program of instructions causing said computerized device to perform a method comprising:

creating a user profile for printing device operations using a first computerized device;

creating at least one template within said user profile using said first computerized device; and sending said user profile from said first computerized device to a printing device, over a network as a print ready file of a print job, said sending delivering said print ready file of said print job in a delivery manner that print files are delivered to said printing device in print jobs over said network, said print ready file being distinguished from said print files by identifiers that identify said print ready file as containing said user profile, storing said user profile within a computer-readable storage medium positioned within a printer body housing of said printing device, said template comprising selections of menu options offered by said printing device, wherein a user operates said printing device using said profile and said template more than one time, each time said user operates said printing device, said user is presented with an option to access said user profile and to cause said template to automatically select said menu options offered by said printing device, and each time said user operates said printing device after accessing said user profile from said computer-readable storage medium of said printing device, said printing device performs operations according to selected menu options identified by said template.

14. The non-transitory computer-readable storage medium according to claim 13, further comprising saving said user profile within computer-readable storage medium of said first computerized device.

15. The non-transitory computer-readable storage medium according to claim 13, further comprising contacting a second computerized device through a network to access a utility that creates said user profile and said template.

16. The non-transitory computer-readable storage medium according to claim 13, said user profile having an expiration, said printing device deleting said user profile from said computer-readable storage medium of said printing device after said expiration has expired.

\* \* \* \* \*